United States Patent [19]
Heil et al.

[11] Patent Number: 5,546,853
[45] Date of Patent: Aug. 20, 1996

[54] BARBECUE GRILL WITH FLUIDIC BURNER AND HEAT DISTRIBUTION SYSTEM

[75] Inventors: Fred Heil, Baltimore; Michael Lombardo, Forest Hill, both of Md.

[73] Assignee: Bowles Fluidics Corporation

[21] Appl. No.: 404,635

[22] Filed: Mar. 15, 1995

[51] Int. Cl.⁶ .............................. A47J 37/00; A47J 37/07
[52] U.S. Cl. .................... 99/447; 99/401; 99/446; 99/450; 126/25 R; 126/41 R; 431/2; 431/8
[58] Field of Search .................. 99/339, 340, 400, 99/401, 444–447, 421 H, 450, 482, 448; 126/25 R, 9 R, 41 R; 431/326, 328, 1, 2, 8, 252, 127, 344; 239/11, 589.1, 590.5, DIG. 7; 122/17, 24

[56] References Cited

U.S. PATENT DOCUMENTS

| | | | |
|---|---|---|---|
| 2,153,265 | 4/1939 | Meeks | 99/401 |
| 3,412,674 | 11/1968 | Ruth | 99/401 |
| 3,593,647 | 7/1971 | Copeland, Jr. | 99/446 |
| 4,210,072 | 7/1980 | Pedrini | 99/447 |
| 4,446,846 | 5/1984 | Hahn | 99/447 |
| 4,750,469 | 6/1988 | Biggs | 126/25 R |
| 4,773,319 | 9/1988 | Holland | 126/41 R |
| 4,823,684 | 4/1989 | Traeger et al. | 99/450 |
| 5,163,358 | 11/1992 | Hanagan et al. | 99/401 |
| 5,277,106 | 1/1994 | Raymer et al. | 99/447 |
| 5,313,877 | 5/1994 | Holland | 99/400 |
| 5,355,868 | 10/1994 | Haen | 126/41 R |

*Primary Examiner*—Timothy F. Simone
*Attorney, Agent, or Firm*—Jim Zegeer, Esquire

[57] ABSTRACT

A gas barbecue grill has a housing, a grate supported by the housing for supporting food for cooking, and a gas burner for supplying heat. The gas burner includes at least one fluidic burner element centrally located and projecting a heating flame aligned substantially along the centerline and downward. A heat distribution member having an axis aligned with the centerline has at least a pair of downwardly diverging planar elements with the burner projecting a flame along the centerline which heats the center of the distribution member. The heat distribution member has first and second groups of apertures, the first group of apertures being proximate one end of the heat distribution member and spaced from the center of each of said planar elements. A second group of apertures formed proximate the end of heat distribution member opposite the burner end and spaced from the center of the distribution member and in each of the planar elements. The ratio of the total area of said apertures in the first group to the total surface area of the distribution member is greater than the ratio of the total surface area of the apertures in the second group to the total surface area of the distribution member. One or more additional non-oscillating gas jets may be provided.

10 Claims, 5 Drawing Sheets

BARBECUE GRILL WITH FLUIDIC BURNER AND HEAT DISTRIBUTION SYSTEM

REFERENCE TO RELATED APPLICATIONS

The present application is related to Stouffer et al. U.S. patent application Ser. No. 260,441 filed Jun. 15, 1994, U.S Pat. No. 5,445,516, for "BURNER METHOD AND APPARATUS HAVING LOW EMISSIONS", Stouffer et al. U.S. patent application Ser. No. 216,522 filed Mar. 23, 1994, U.S. Pat. No. 5,448,969, for "FLUIDIC BURNER", and Stouffer U.S. Pat. No. 5,149,263 for "TORCH BURNER METHOD AND APPARATUS", incorporated herein by reference.

BACKGROUND AND BRIEF DESCRIPTION OF THE INVENTION

The present invention relates to barbecue grills and, more particularly, to barbecue grills having fluidic burners and a heat distribution system for uniformly distributing heat over the cooking area for food.

In recent years, gas barbecue grills have become quite popular. In many barbecue grills, uniform heat distribution is sought to be achieved by the use of a bed of lava rocks and/or a slotted heat distribution plates to minimize hot spots on the grill surface.

In Raymer U.S. Pat. No. 5,277,106 and in U.S. Pat. No. 5,163,358, a slotted heat distribution plate is provided which allows a control flare-up through a system of holes or slots allowing dripping fats to be ignited. In such systems, the slots typically are uniformly distributed over a metal plate which is supported above a burner which is extended along the base of a containment housing.

In the above-referenced related patent applications, gas burners are disclosed in which a jet of fuel is oscillated transversely in the direction of flow and the mixing of the gas with air takes place in a combustion area spaced away from the nozzle and no mixer or venturi is required.

According to the present invention, a gas barbecue grill includes a fluidic grill burner and heat distribution member which coact as a unit. Shaped flames from the fluidic burner are generally shaped to match the grill body and the heat distribution member is configured to equalize cooking temperature over the entire grill surface.

In a preferred embodiment, the fluidic burner is mounted in the ends or sides of the grill bottom or base housing between the grill bottom and the heat distribution member. The side or end location is preferred because this location is out of the area of contamination and overheating. It is arranged to fire down the long axis of the grill (assuming that the grill is rectangular, but if the grill is not rectangular then it is arranged to fire down one given axis of the grill) and, in the preferred embodiment, is aimed downwardly at a 10° angle to compensate for the normal flame lift. The fluidic burner can be mounted directly on the gas pressure regulator or even be made a part of the regulator body thereby eliminating a potential leak area.

The distribution member is mounted in the grill housing by resting on grill leg extensions, or an integrally formed legs, or on detents on the housing walls. The distribution member is kept centered in the grill base or housing by its size and geometry. The heat distribution member is tent or inverted "V" shaped by being bent about 10° along its centerline. This tent shape provides structural rigidity and improves heat distribution along the axis. Two groups of holes or apertures (which may be round or square holes or elongated slots) representing about 7% of the total surface area of the distribution member are formed, stamped, cut or drilled in the plate in a pattern to further improve heat distribution. In one specific embodiment, a plurality of holes or apertures are formed at the burner end of the heat distribution member and a significantly larger number of holes or apertures are formed in the far end. The center section is solid and, preferably, does not have any holes or apertures therein. With this arrangement, radiation from the hot solid center section is the primary heat transfer mechanism on the center portion of the grate and convection is the primary heating method at the ends. The holes or apertures also allow some cooking grease to fall into the flame which is considered important for cooking flavor. The distribution member can be easily modified to serve as a smoke generator by adding a depression to hold wood chips or other "smokers" and the lateral edges can be turned up to collect grease and funnel grease to a collection point. Advantages of the invention may be summarized as follows:

The heat distribution member distributes heat uniformly over the cooking surface, it shields the cooking surface from direct flame contact, and it is self-centering and supported off of existing grill structure, or may be provided with legs to support same.

The burner itself is protected from overheating and corrosion by being located, in the preferred embodiment, at the end or side walls of the grill housing and fires propane gas directly not requiring any mixer or venturi action. Moreover, the fluidic burner nozzle can be permanently mounted to the regulator or in the regulator, eliminating a potential leak area.

The above and other objects, advantages and features of the invention will become more apparent when considered with the following specification and accompanying drawings wherein:

DETAILED DESCRIPTION OF THE INVENTION

Figure 1:
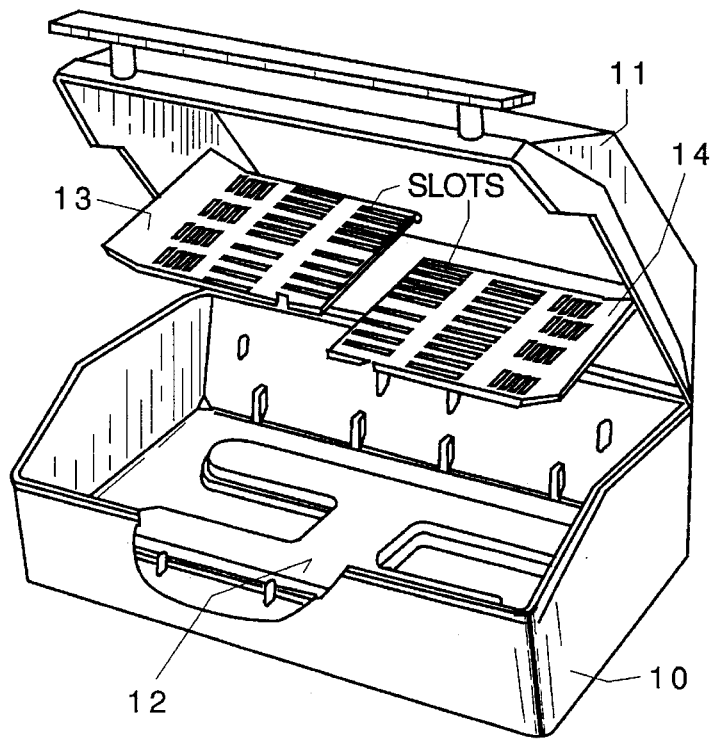
FIG. 1 corresponds to FIG. 18 of Raymer et al. U.S. Pat. No. 5,277,106 showing an exploded view of portions of a barbecue grill with a heat distribution plate.

Referring to FIG. 1, a prior art gas barbecue grill with distribution plate is illustrated having a housing 10 with cover or lid 11. A fuel burner 12 which is connected to a fuel tank and regulator (not shown) and a pair of slotted heat distribution plates 13 and 14 which are held in position in the housing 10 by flanges on the housing. A grate (not shown) is provided for supporting the food to be cooked above the heat distribution plates 13 and 14. Other gas burners, particularly table-top gas grills, and, more particularly, low-cost gas grills, heat distribution is not very good. By improving the heat distribution, the cooking characteristics are improved.

According to the present invention, the heat distribution member is a steel (preferably stainless steel) member shaped to cover the majority (over 90%) of the grill body with a an inverted V-shape with the bend of the V being along the centerline of the grill body. The height of the V-bend line is approximately ¾" and holes or apertures such as round holes or slots are cut, drilled, or punched into place with the size and location and the number of these apertures being designed to suit to burner position as shown later herein.

Referring now to FIGS. 2–5, a portable table-top gas barbecue grill is comprised of a base housing member 15 supported by a pair of U-shaped wire leg members 16, 17 which project in holes 19, 21 and 20, 22 in the housing and, which can pivot to clamp the cover 23 (shown in partial in FIG. 4) in place. The housing base 15 is provided with a peripheral flange 24 upon which rests a conventional grate 25 which forms or define the cooking surface for supporting food to be cooked. A propane gas tank or bottle 26 provides gas through a valve regulator 27 to a fluidic nozzle having a fluidic circuit illustrated in FIG. 6.

Figure 4:
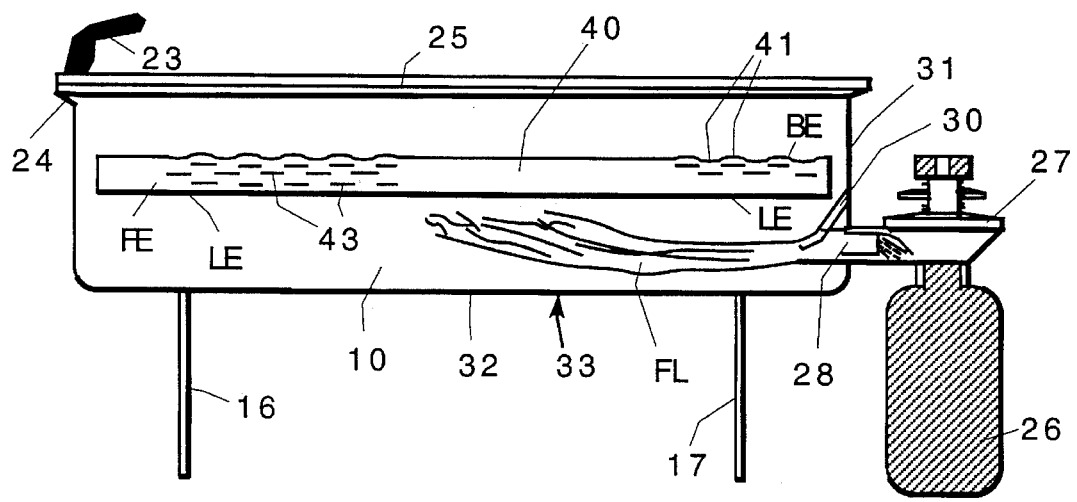
FIG. 4 is a sectional view taken on lines 4—4 of FIG. 3.
Figure 8A:
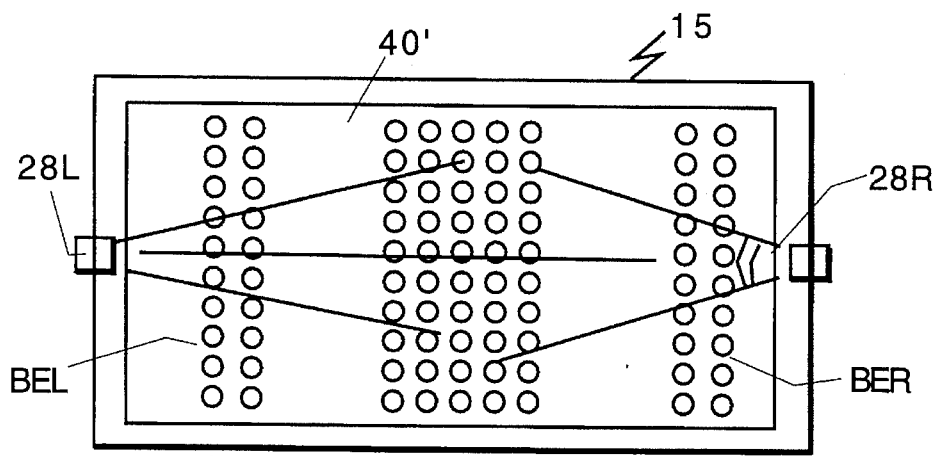
FIGS. 8A, 8B and 8C illustrate further embodiments of the invention.
Figure 8B:
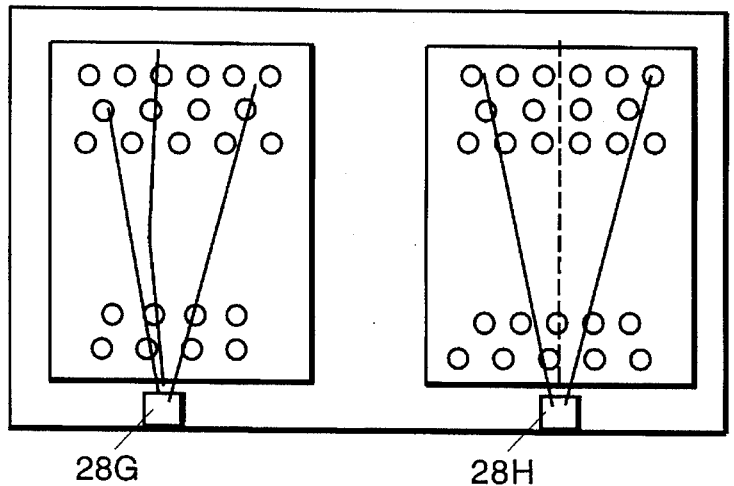
Figure 8C:
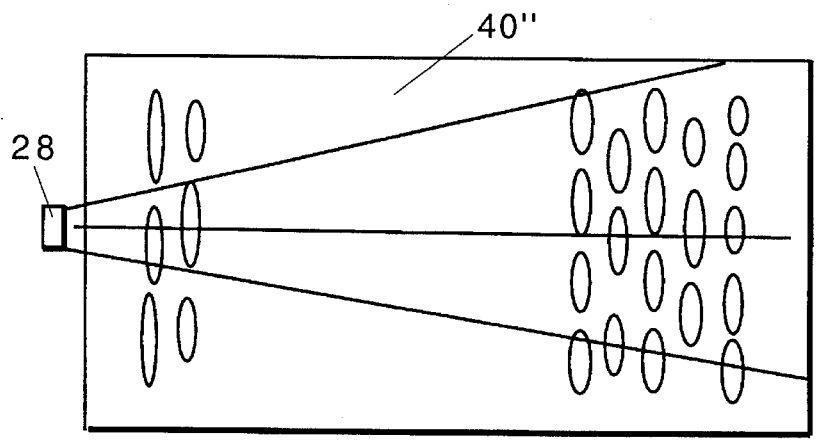

In the preferred embodiment, the fluidic oscillator or fluidic nozzle is arranged to fire down the long axis of the grill (see FIG. 4) and is aimed, in a preferred embodiment, at about a 10° down angle to compensate for the normal flame lift. As indicated in FIG. 4, the burner can be mounted directly to the gas pressure regulator or even be made of part of the regulator so as to avoid a possible source of gas leak. Note in this embodiment the gas is fired directly from the fluidic oscillator and no mixer or venturi is required. This permits the burner to be mounted directly in the sidewall in the preferred embodiment of the housing base 15 where it is protected from overheating and corrosion. As shown in FIGS. 8A, 8B and 8C, it can be mounted in the sides or ends or back wall. In a lesser preferred embodiment shown in FIG. 9, a pair of fluidic nozzles can be centrally located.

Combustion air is admitted to the combustion area by means of louvered vents 30 in end wall 31. In addition, the series of holes 32 in bottom wall 33 allows additional air to feed the flames in the combustion area.

Figure 3:
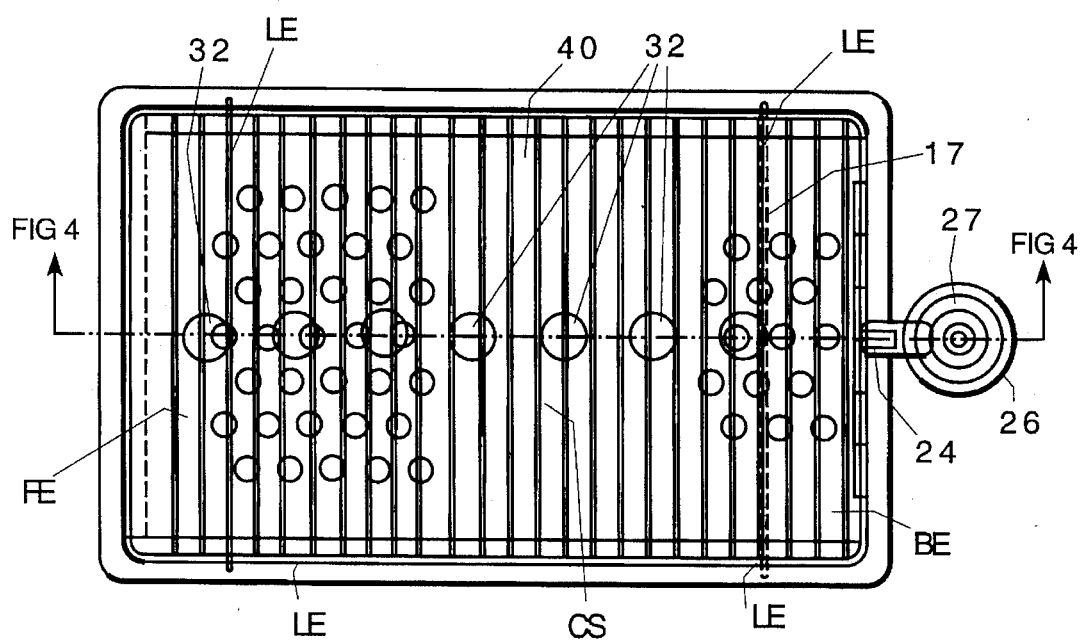
FIG. 3 is a top plan view of the grill shown in FIG. 2.
Figure 2:
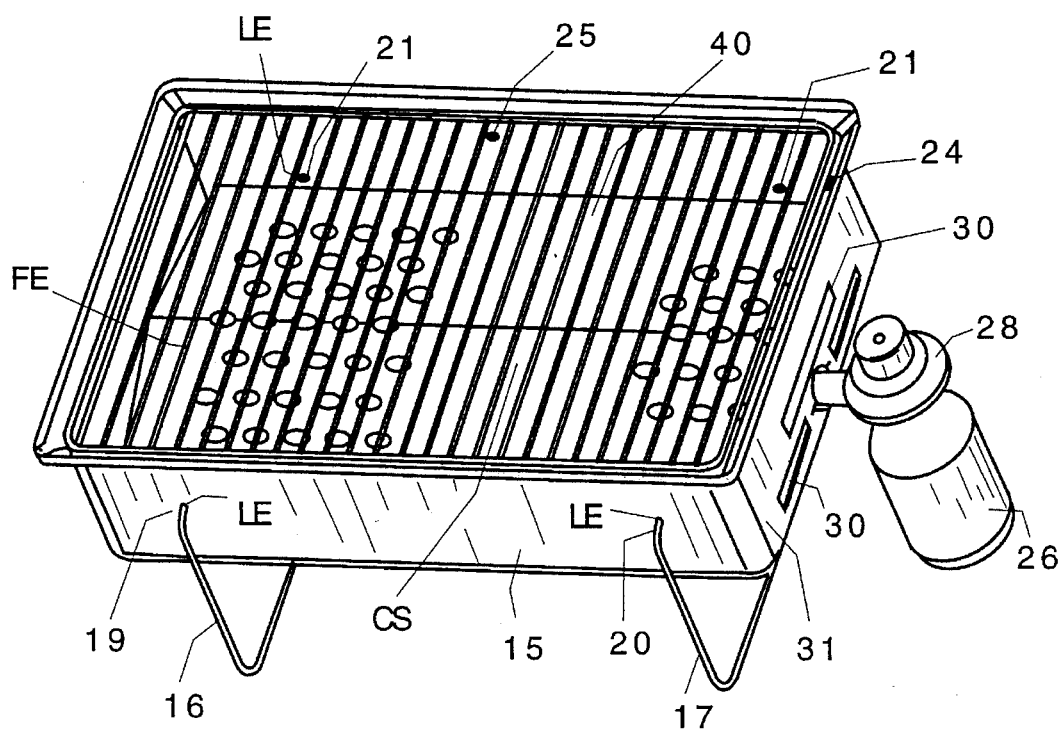
FIG. 2 is a perspective view of a gas barbecue grill incorporating the invention.
Figure 5:
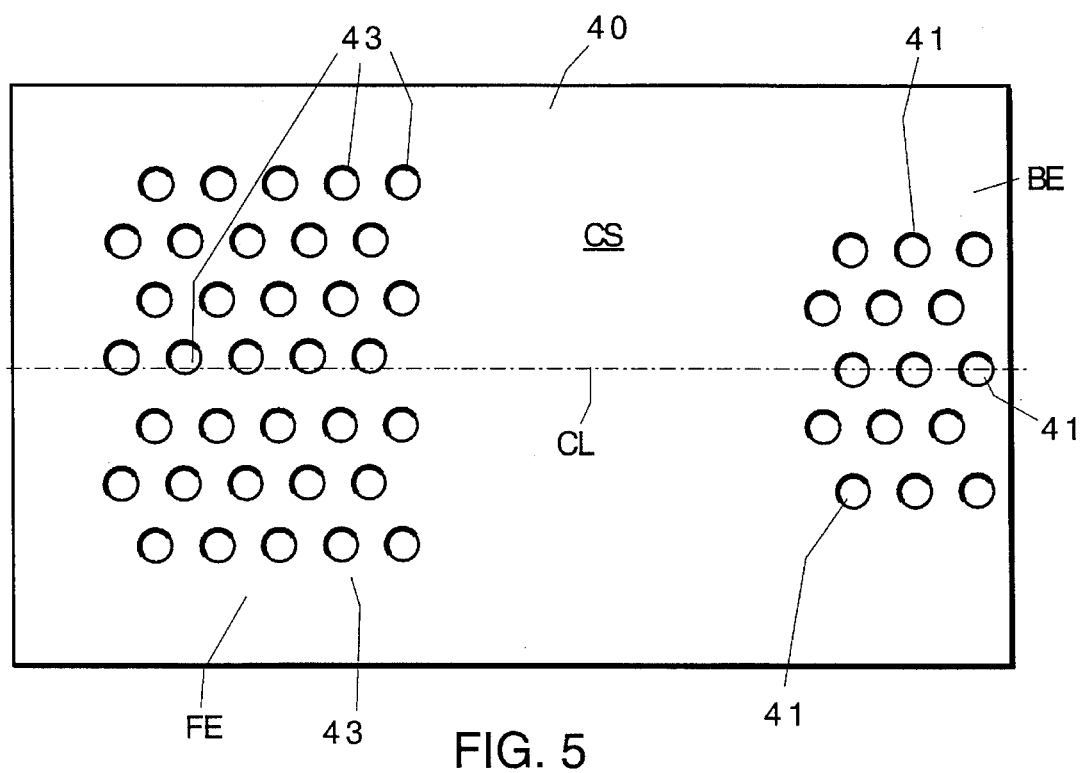
FIG. 5 is a top plan view of a radiation distribution member of the present invention.
Figure 7A:
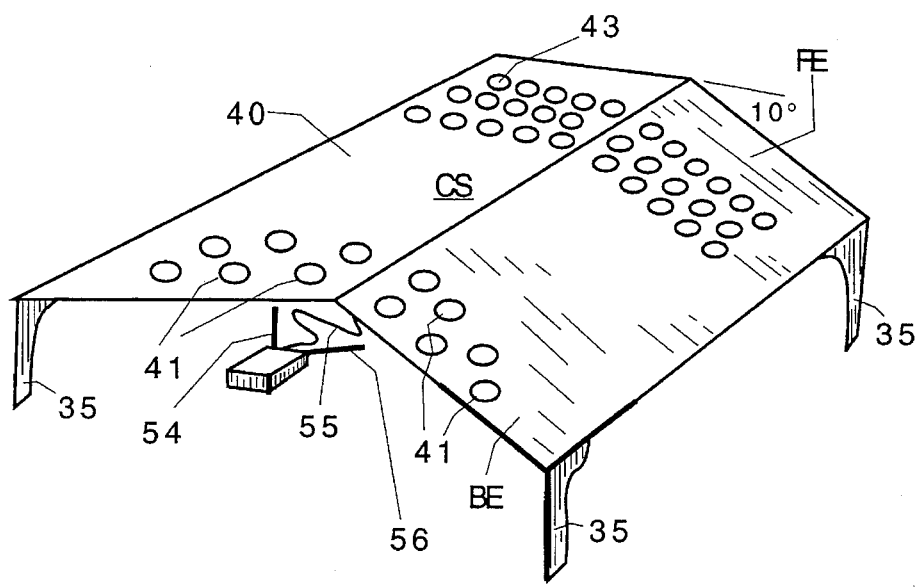
FIG. 7A is a perspective view of a modification showing the basic structure of the combination of fluidic grill burner and heat distribution member of the present invention.
Figure 7B:
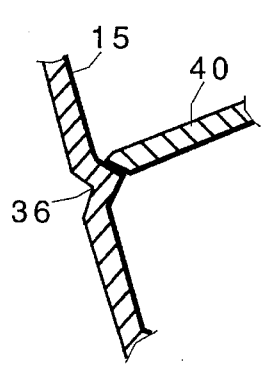
FIG. 7B is a partial sectional view showing the support of the distribution member on leg extensions.
Figure 7C:
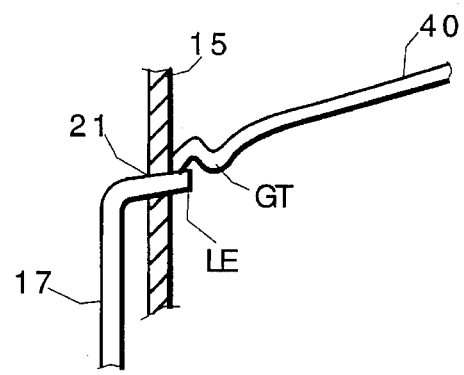
FIG. 7C is a sectional view showing a grease trough in the distribution member.

A heat distribution member 40 is mounted in the grill housing 15 and resting on leg extensions LE. As shown in FIGS. 7A and 7B, the heat distribution member may be provided with downwardly depending legs 35 which may be integrally formed or attached by rivets or the like or, as shown in FIG. 7B, detents or inward detentions or dimples formed in the sidewall 15 a predetermined distance above the bottom 33 of housing 15. As shown in FIG. 7C, a grease trough GT may be formed in the lateral edge of member 40. Distribution member 40 has a centerline CL which, in the embodiment shown in FIGS. 2–4, is aligned with the centerline of the base and the flame FL which, preferably, is aligned with the centerline, but not necessarily so. It can be offset to one side or the other of the centerline and still good results be obtained. That is to say, there can be some misalignment.

As shown in FIG. 7A, the heat distribution member is tent shaped by being bent about 10°, more or less, along its centerline. This tent shape provides structural rigidity and, at the same time, improves heat distribution along the axis thereof. A first group (15) of holes 41 is provided at the burner end BE of the heat distribution member and, a significantly larger number (35) of holes or apertures 43 is provided at the far or distant end FE. The center section CS is preferably substantially solid. As shown in FIG. 8C, the apertures or openings can be slots or other appropriate shape for purposes of convection heating of food supported on the grill at the cooking surface. With this arrangement, radiation from the hot distribution member is the primary heat transfer mechanism on the center portion of the cooking surface and convection is a primary mechanism of heat transfer at the ends of the cooking surface. The holes or apertures allow some cooking grease to fall into the flame which can enhance the cooking flavor. The heat distribution member could also be modified to incorporate a depression to hold a smoke generator of wood chips or other smokers and, the lateral edges could also be turned up (gT) to collect grease.

Figure 6:
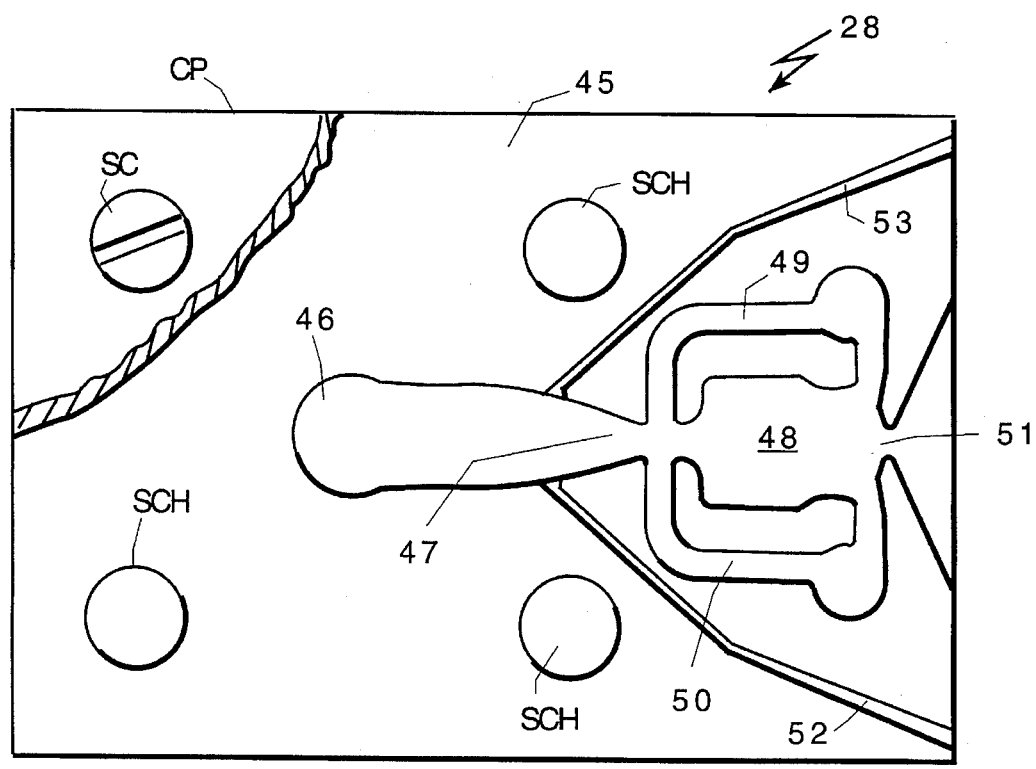
FIG. 6 is a plan view of a fluidic circuit or silhouette incorporated in the invention.

As used herein, the term "fluidic nozzle" means a no-moving part fluidic oscillator having an outlet projecting an oscillating stream of gas to be combusted. While various forms of fluidic oscillators can be used in the practice of the invention, the preferred embodiment as illustrated in FIG. 6 is of the uniform distribution type disclosed in Stouffer U.S. Pat. No. 4,508,267. In this embodiment, the fluidic oscillator 45 has a gas input chamber 46 which feeds a power nozzle 47 which issues a jet of fuel into oscillation chamber 48 forming vortices which, in conjunction with passages 49 and 50, causes oscillation of the jet of gas issuing from outlet 51 in the manner described more fully in the above-referenced Stouffer patents and above-referenced related patent applications. In this embodiment, one or more parallel passages 52, 53 for directing gas from the gas input chamber 46 can be compressed in a space parallel to the flame of the fluidic burner. In FIG. 7A, these provide two small jets of gas 54, 55. In addition to the main oscillating jet of combustible gas 56 being projected into the combustion area. These provide additional heating effect for the burner end BE of distribution member 40. A cover plate CP is fastened by screws SC in screw holes SCH in body member 45.

In the embodiment shown in FIG. 8, a pair of fluidic nozzles 28A and 28B are provided with a single tented or inverted V heat distribution member 40'. Here, the burner ends BEL and BER are provided with respective hole groupings while the center section of the plate 40' is provided with holes 43', which are the equivalent of the holes 43 in the far end or plate 40 (shown in the embodiments of FIGS. 2, 3, 4 and 5). In this embodiment, the far end of the plate serves as a common far end for each burner 28L and 28R. In the embodiment shown in FIG. 8B, the barbecue grill is provided with a pair of heat distribution plates with separate fluidic burner nozzles 28G and 28H. In the embodiment shown in FIG. 8C, the groups of apertures are in the form of elongated slots. It will be appreciated that the apertures can be combinations of slots and holes or apertures of other parametric configuration such as hexagonal.

Figure 9:
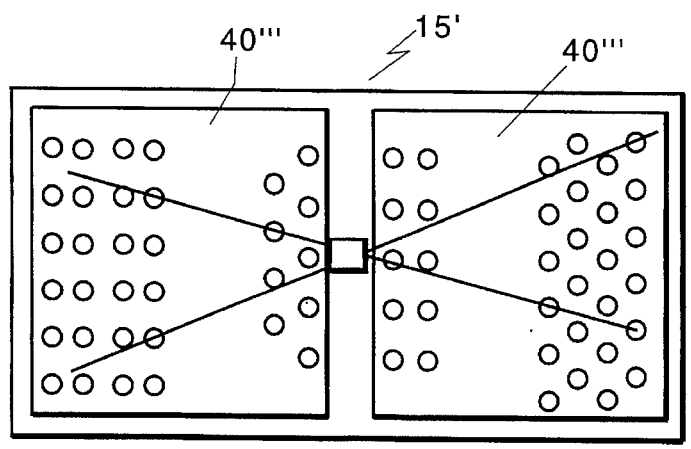
FIG. 9 illustrates a less preferred embodiment of the invention.

In the embodiment shown in FIG. 9, one of the advantages and features of the embodiment shown in FIGS. 2–8 is not achieved in that since the burner is centrally located, and not at the end of the grill base, it is not protected from corrosion, etc. But, the heat distribution properties obtained in this embodiment where two centrally located fluidic burners are used to heat two separate heat distribution members as described earlier.

Having thus described preferred and lesser preferred embodiments of the inventions, it will be appreciated that other embodiments, modification and adaptations of the invention will become readily apparent to those skilled in the art.

We claim:

1. In a gas barbecue grill having a housing, said housing having ends, sides and bottom walls and a centerline, a grate supported by said housing to support food for cooking, a gas burner means for supplying heat, the improvement wherein said burner means includes at least one fluidic burner element centrally located and projecting a heating flame aligned substantially along the centerline, a heat radiation and distribution member having an axis aligned with said centerline and at least a pair of downwardly diverging planar elements, said burner projecting a flame along said centerline which heats the center of said radiation and distribution member, said radiation and distribution member having first and second groups of apertures, said first group of apertures being proximate one end of said radiation and distribution member and spaced from said center of said radiation and distribution member and in each of said planar elements, said second group of apertures being proximate the end of said heat radiation and distribution member opposite said one end and spaced from said center of said radiation and distribution member and in each of said planar elements, whereby substantially uniform heating is delivered to food supported on said grate.

2. The gas barbecue grill defined in claim 1 wherein the ratio of the total area of said apertures in said first group to the total surface area of said radiation and distribution member is greater than the ratio of the total surface area of said apertures in said second group to the total surface area of said radiation and distribution member.

3. The gas barbecue grill defined in any one of claim 1 or claim 2 wherein said fluidic nozzle has a centerline, and said centerline is oriented in a downward direction relative to the axis of said radiation and distribution member.

4. The gas barbecue grill defined in claim 1 wherein said fluidic element includes a gas input chamber, and one or more parallel passages directing gas from said gas input chamber to be combusted in a space parallel to the flame space of said fluidic burner.

5. The gas barbecue grill defined in claim 1 wherein said gas burner means includes a pressure regulator between a supply and said fluidic nozzle, and incudes a chamber found in said regulator and said fluidic nozzle being mounted in said chamber to form a part of said regulator and eliminating a potential leak area.

6. The gas barbecue grill defined in claim 1 wherein said radiation and distribution is made of stainless steel.

7. The gas barbecue grill defined in claim 1 wherein said fluidic nozzle is oriented relative to said downwardly diverging planar elements to impinge thereon between said first and second groups of apertures.

8. In a gas grill having a housing, said housing having ends, sides and bottom walls and a centerline, a food supporting grate supported by said housing to support food for cooking, a gas burner means for supplying heat, the improvement comprising a heat distribution member having at least a pair of downwardly diverging planar elements first and second ends and a center, said gas burner means including at least one fluidic burner element positioned to project a heating flame along a substantially horizontal path between said pair of diverging planar elements and adjacent said heat distribution member to heat said heat distribution member, said heat distribution member having first and second groups of apertures, said first group of apertures being proximate said first end of said heat distribution member and spaced from said center of said distribution member and in each of said planar elements, said second group of apertures being proximate said second end of said heat distribution member opposite and spaced from said center of said distribution member, whereby substantially uniform heating is delivered to food supported on said grate.

9. A gas grill having a housing, said housing having ends, sides and bottom walls, a grate supported by said housing to support food for cooking, a fluidic gas burner, said fluidic gas burner being located and projecting an oscillating jet of burning fuel along a path and creating a heating flame, a heat distribution member having an axis aligned with said path and at least a pair of planar elements which are downwardly diverging relative to said path, said a flame being projected by said fluidic gas burner along said path to heat the center of said distribution member, said distribution member having first and second groups of apertures, said first group of apertures being proximate one end of said heat radiation and distribution member and spaced from said center of said distribution member and in each of said planar elements, said second group of apertures being proximate the end of said heat distribution member opposite said one end and spaced from said center of said distribution member and in each of said planar elements, whereby substantially uniform heating is delivered to food supported on said grate.

10. The gas grill defined in claim 9 wherein said fluidic burner nozzle is mounted in a wall of said housing.

* * * * *